(12) United States Patent
Sakaigawa

(10) Patent No.: US 6,680,760 B2
(45) Date of Patent: Jan. 20, 2004

(54) LIQUID CRYSTAL DISPLAY DEVICE

(75) Inventor: Akira Sakaigawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 10/006,101

(22) Filed: Dec. 4, 2001

(65) Prior Publication Data

US 2002/0105606 A1 Aug. 8, 2002

(30) Foreign Application Priority Data

Dec. 4, 2000 (JP) ..................................... P2000-368634

(51) Int. Cl.$^7$ ................................................. G02S 1/17
(52) U.S. Cl. ......................................................... 349/69
(58) Field of Search .......................................... 349/69

(56) References Cited

U.S. PATENT DOCUMENTS 4,126,384 A * 11/1978 Goodman et al. ............ 349/69
4,500,173 A * 2/1985 Leibowitz et al. ............ 349/69
6,208,391 B1 * 3/2001 Fukushima et al. ........... 349/69
6,507,379 B1 * 1/2003 Yokoyama et al. ........... 349/69

OTHER PUBLICATIONS

Bahadur "Liquid crystals: applications and uses", pp. 241–246, section 10.2.4 to 10.2.5.1.1 by T. Scheffer & J. Nehring.*

* cited by examiner

*Primary Examiner*—James Dudek
(74) *Attorney, Agent, or Firm*—Sonnenschein, Nath & Rosenthal LLP (57) ABSTRACT

Liquid crystal display device of lightweight material, low power consumption and long operational life, capable of a high quality display in both dark and bright environments. In a liquid crystal device comprising a liquid crystal layer enclosed by a pair of substrates containing two electrodes facing each other on opposing sides and a liquid crystal material layer driven by electrodes enclosed by that pair of substrates, a dark display is shown when no electrical field is applied to the liquid crystal layer; and a field light emission layer is formed driven by electrodes between the pair of substrates.

8 Claims, 6 Drawing Sheets

TFT2 (CROSS-SECTION ALONG LINE x-x)

FIG.2C

TFT1 (CROSS-SECTION ALONG LINE y-y)

FIG.3A

BLACK DISPLAY (FIELD OFF)

FIG.3B

WHITE DISPLAY (FIELD ON)

FIG.4A

BLACK DISPLAY (FIELD OFF)

FIG.4B

WHITE DISPLAY (FIELD ON)

LIQUID CRYSTAL DISPLAY DEVICE

RELATED APPLICATION DATA

The present application claims priority to Japanese Application(s) No(s). P2000-368634 filed Dec. 4, 2000, which application(s) is/are incorporated herein by reference to the extent permitted by law.

BACKGROUND OF THE INVENTION

1. Field of the Invention

The present invention relates to a liquid crystal display device having a field light emission layer driven by electrodes on a pair of opposing substrates.

2. Description of the Related Art

The liquid crystal display device along with having a lighter and thinner shape than display devices such as utilizing cathode ray tubes, further has low power consumption and so is used in display devices on portable information terminals, etc.

Display devices for portable information terminals must be lightweight, thin, and along with low power consumption must also have a display easily visible in all kinds of environments. However among the various liquid crystal display devices of the related art, transmittance type liquid crystal displays have backlighting (backlit display) that makes them easily visible in dark surroundings yet makes the transmittance type liquid crystal display nearly impossible to see when under an extremely bright external light such as sunlight.

Reflective liquid crystal display devices on the other hand, though easy to see in brightly lit surroundings have the disadvantage of being hard to view in dark surroundings. Front lighting with light guide plates above the liquid crystal panel therefore had to be installed in these reflective liquid crystal display devices. However, using this front lighting brings the problems of lower reflectance, lower contrast and projection of external light, etc.

To resolve the problems with the transmittance type liquid crystal display devices and reflective type liquid crystal display devices, a semipermeable reflective liquid crystal display device incorporating a transmittance display and a reflective display into one liquid crystal display device was developed that allowed a portion of the backlight to transmit through, and reflected a portion of the surrounding (ambient) light. However the display characteristics of this liquid crystal display device were inadequate because light transmittance was worse than in transmittance liquid crystal display devices of the related art, while the reflectivity of the display was worse than reflective liquid crystal display devices of the related art. The light transmittance ratio was particularly low so that the brightness dropped drastically when transmitting an image through the screen during transmittance mode display. Compensating for the drop in brightness required increasing the backlight brightness causing the problem of higher power consumption.

Further, installing backlighting or a frontlight in the liquid crystal display device increased the module thickness and weight making it unsuitable for use in portable information terminals.

Self-luminescent elements such as used in electroluminescent display devices on the other hand, had features such as thinness, lightweight and high contrast as well as high brightness allowing use even in environments that were somewhat bright. These device characteristics led to expectations that self-luminescent elements would be ideal for use in portable information terminals.

However electroluminescent display devices using electroluminescent elements were also subject to drastic drops in recognizability under extremely strong external light such as sunlight. These devices also had the drawback of power consumption much larger than semireflective display devices. Electroluminescent elements had the further disadvantages of a short operational life and were unable to withstand long-term use.

To resolve the above-mentioned problems in the liquid crystal display devices and electroluminescence display devices, a display device having an organic electroluminescent element in the rear of the display device was disclosed in Japanese Patent Laid-Open No. Hei 9-50031 and Japanese Patent Laid-Open No. Hei 10-125461. These display devices utilize a reflective liquid crystal display device in bright surroundings, and transmittance type liquid crystal display device backlit with organic electroluminescent elements in dark surroundings. All of the pixels are used during a reflective display and all of the pixels are used for transmittance display so a high quality display could be obtained in different surroundings.

However, the light source comprised of organic electroluminescent elements was separate from the liquid crystal display device creating the problem of a module that was too thick and heavy. Also, the light source of organic electroluminescent elements was always lit up in dark surroundings, causing the problem that operational life was short.

In Japanese Patent Laid-Open No. Hei 11-249133 and Japanese Patent Laid-Open No. Hei 11-305224 on the other hand, technology was disclosed for mounting organic electroluminescent elements on the upper surface of a reflective type liquid crystal display device. These display devices attempted to resolve the problem of the front light in the related art. The structure described in Japanese Patent Laid-Open No. Hei 11-249133 required a deflection plate between the organic electroluminescence layer and the liquid crystal display device. However, forming an organic electroluminescent layer on the deflection plate was difficult. Making a deflection plate on the inner side of the transparent substrate of the liquid crystal display device was also possible however this method was not practical since the device characteristics were worse than the film type deflection plate of the related art.

The structure described in Japanese Patent Laid-Open No. Hei 11-305224 required high-precision alignment so that the metallic electrode of the organic electroluminescence element would not overlap the aperture of the liquid crystal display device. Further, an organic electroluminescence element was formed across the entire upper surface of the liquid crystal panel so that the problems of low reflectivity, low contrast and external light projection occurred, the same as in the liquid crystal display device of the related art formed with a front light.

SUMMARY OF THE INVENTION

The present invention has the object of resolving the problems in liquid crystal display devices of the related art having a backlight or front light or liquid crystal display devices of the related art utilizing an organic electroluminescence element as a light source; and providing a liquid crystal display device capable of a high quality display in either bright or dark surroundings, having a thin, lightweight shape and low power consumption, and ideal as a display device for portable information terminals.

In the present invention, a field light emission layer separate from the liquid crystal layer is formed between a pair of substrates comprising the liquid crystal panel or the field light emission layer is formed jointly with the liquid crystal layer, and turning this field light emission layer on and off by driving the electrodes of the liquid crystal layer eliminates the need for a front light or back light and a thin, lightweight structure can be obtained in an extremely simple structure. Further, in bright surroundings, a reflective display is shown utilizing external light, and in dark surroundings a display is shown by emitting light from the field light emission layer. The field light emission layer does not continually emit light during the display in dark surroundings so power consumption is also reduced.

The present invention in other words, provides a liquid crystal display device comprised of a pair of substrates having electrodes on mutually opposing facing sides, and a liquid crystal layer enclosed by the pair of substrates, and displaying a dark screen when no electrical field is applied to the liquid crystal layer, wherein a field light emission layer driven by the electrodes is formed between the pair of substrates.

Particularly a first embodiment of the liquid crystal device, is provided wherein a field light emission liquid crystal material layer is formed as a combined liquid crystal layer and field light emission layer, and in a second embodiment, a liquid crystal layer is formed separately from the field light emission layer.

A manufacturing method for a liquid crystal device of the first embodiment of the present invention is provided for attaching together a pair of substrates having electrodes on one side, with the electrodes facing each other, injecting liquid crystal material between both substrates, in a liquid crystal device displaying a dark screen when no electrical field is applied to the liquid crystal layer, wherein a field light emission liquid crystal material is injected as the liquid crystal material.

A manufacturing method for a liquid crystal device of the second embodiment of the present invention is provided for attaching together a pair of substrates having electrodes on one side, with the electrodes facing each other, injecting liquid crystal material between both substrates, in a liquid crystal device displaying a dark screen when no electrical field is applied to the liquid crystal layer, wherein before attaching the substrates together, a field light emission layer is formed on the electrode of one substrate.

The present invention further provides a liquid crystal display terminal as a portable information terminal having a liquid crystal display device, wherein the liquid crystal display device is composed of a pair of substrates having electrodes on mutually opposing facing sides, and a liquid crystal layer held by the pair of substrates, and the liquid crystal device displays a dark screen when no electrical field is applied to the liquid crystal layer, wherein a field light emission layer driven by the electrodes is formed between the pair of substrates.

The liquid crystal display device of the present invention has the same reflective display in bright surroundings as the reflective type liquid crystal display device of the related art, and in a display in dark surroundings the field light emission layer emits light so that back lights and front lights are unnecessary and an extremely simple thin and lightweight structure can be achieved. Also, the entire pixel range is effectively utilized during both a reflective display and a light emission display. The liquid crystal display device of the present invention is therefore lighter in weight and thinner than liquid crystal display devices of the related art having front lighting or back lighting, and also provides a fine quality display.

Also in the liquid crystal display device of the present invention, the field light emission layer does not continually emit light during light emission display in dark surroundings, light is emitted from the required pixels according to the switching of the liquid crystal layer. The power consumption of the liquid crystal display device of the present invention is therefore low compared to electroluminescence display devices of the related art, and the operational service life is longer.

DETAILED DESCRIPTION OF THE PREFERRED EMBODIMENTS

A detailed description of the present invention is given next while referring to the accompanying drawings. Drawings in figures having the same reference numerals indicate the same or equivalent structural components.

Figure 1:
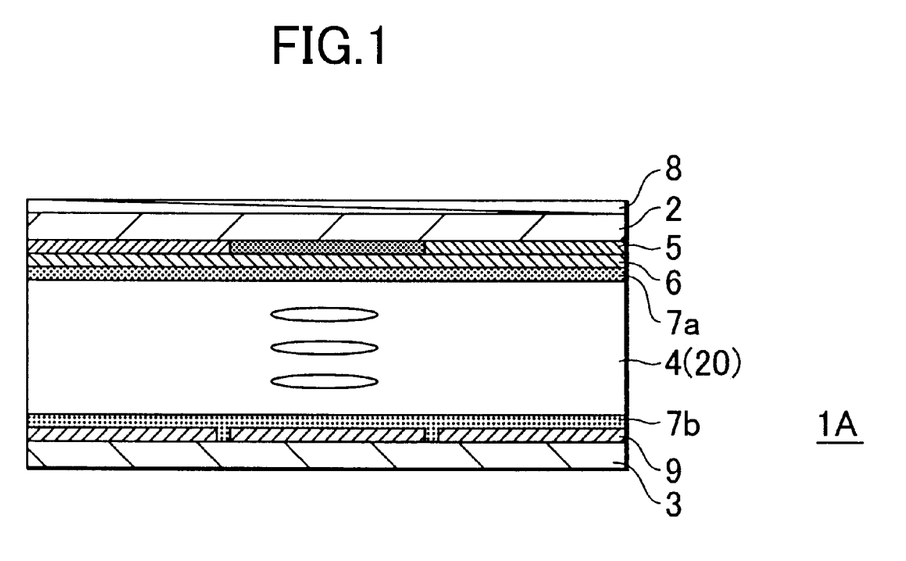
FIG. 1 is a conceptual cross-sectional view of the liquid crystal display device of the present invention.
Figure 2A:
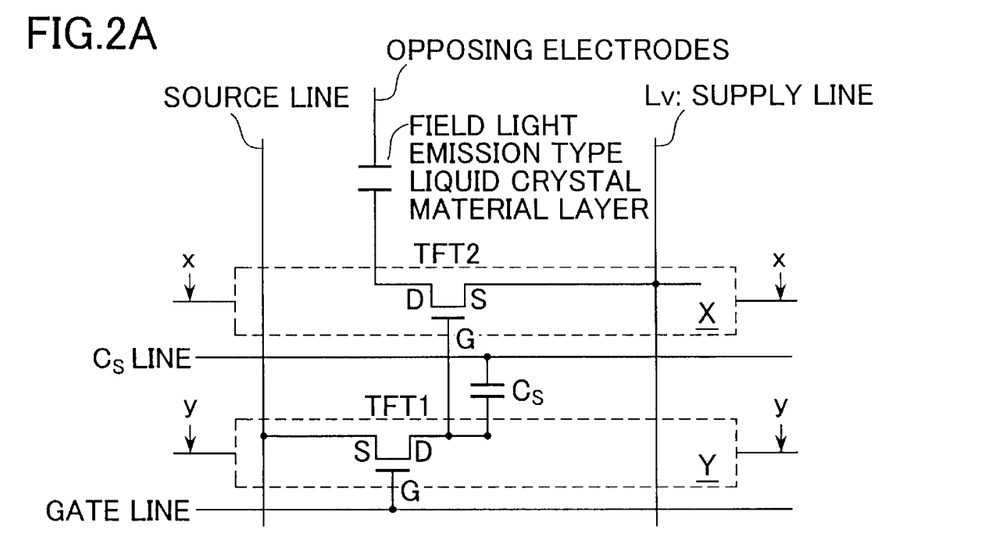
FIG. 2A through FIG. 2C are respectively a drive circuit diagram for a one pixel portion of the liquid crystal display device of the present invention and cross sectional views of the lower substrate.
Figure 2B:
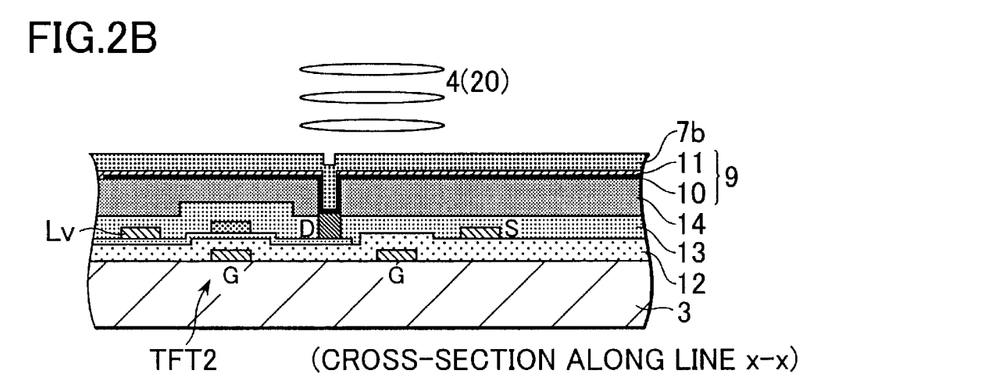
Figure 2C:
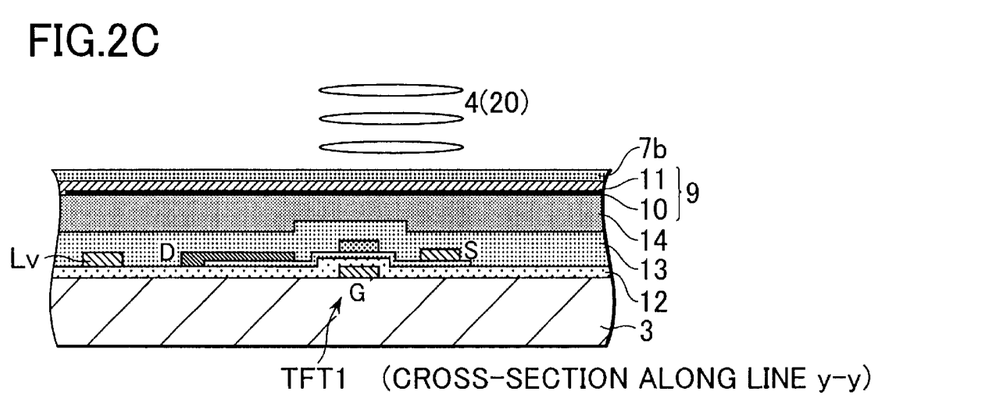

FIG. 1 is a concept cross-sectional view representing the liquid crystal display device of the present invention. FIG. 2A is a drive circuit diagram for a one-pixel portion of this liquid crystal display device. FIG. 2B is a cross-sectional view of the X section of the lower substrate in FIG. 2A. FIG. 2C is a cross-sectional view of the Y section the lower substrate in FIG. 2A.

The liquid crystal display device 1A functions as a reflective type liquid crystal display device in bright surroundings, and functions in dark surroundings as a field light emission liquid crystal display device for displaying light emitted from the field light emission layer.

The layer structure of this liquid crystal display device 1A as shown in FIG. 1, is the same as a reflective type liquid crystal display device of the related art, comprising a liquid crystal cell consisting of an upper substrate 2 made from transparent glass or plastic, and an opposing (facing) lower substrate 3 having a reflective layer 11 (FIG. 2B) and a liquid crystal layer 4 supported between both substrates.

A color filter 5, transparent electrode 6 and alignment film 7a are laminated sequentially on the side facing the lower substrate 3 of the upper substrate 2. A deflecting plate 8 is formed on the outer surface of the liquid crystal cell of upper substrate 2. Here, the transparent electrode 6 is formed from a transparent conductive membrane such as ITO, and the alignment film 7a is formed of transparent film such as polyimide or polyamide subjected to alignment processing. Besides being formed on the upper substrate 2 as shown in the figure, the color filter 5 may be formed on the lower substrate 3. In that case, it is preferably formed on the reflective layer 11.

A reflective electrode 9 and an alignment film 7b on the other hand, are formed in sequence on the lower substrate 3 on the side facing the upper substrate 2. The alignment film 7b can be formed the same as the alignment film 7a of upper substrate 2.

The reflective electrode 9 is formed from a reflective layer 11 on and above the conductive layer 10 as shown in FIG. 2B and FIG. 2C. The conductive layer 10 is formed from a transparent conductive film such as ITO (indium tin oxide) The reflective layer 11 is formed by depositing highly reflective material such as aluminum or silver or their oxides or alloys by sputtering or by vapor deposition to form a film. A single layer of reflecting electrode integrating the conductive layer 10 and reflective layer 11 into one layer utilizing the aforementioned highly reflective material may also be formed instead of using a laminated structure for this kind of conductive layer 10 and reflective layer 11. When forming the conductive layer 10 and reflective layer 11 as separate layers, the reflective layer 11 need not always be formed on conductive layer 10 and for example, may be formed on the lower surface (external side surface of the liquid crystal cell) of the lower substrate 3.

A TFT and wiring to drive the active matrix for liquid crystal layer 4 are formed on the lower substrate 3. In FIG. 2B and FIG. 2C, the reference numeral 12 denotes agate insulator film, the reference numeral 13 denotes an interlayer insulator film, and the reference numeral 14 denotes a leveling layer.

In the liquid crystal display device 1A, a field light emission type liquid crystal material layer 20 is formed from field light emission type liquid crystal material as a combined liquid crystal layer and field light emission layer to constitute the liquid crystal layer 4.

In regards to characteristics of the liquid crystal layer constituted by the field light emission type liquid crystal material layer 20, both the horizontal alignment and vertical alignment are good, and the nematic liquid crystal and smectic liquid crystal also have good characteristics. When in the nematic liquid crystal state, both the TN mode and vertical alignment mode can be used the same as the liquid crystal device of the related art so characteristics are satisfactory. When in the smectic liquid crystal state, the high speed response allows use over a wide visual angle so characteristics are satisfactory. In particular, the normally black mode described later on can easily be created on the liquid crystal display device 1A and so is satisfactory.

In regards to characteristics of the field light emission layer of field light emission liquid crystal material layer 20 on the other hand, turning an applied voltage on or off at the electrode (transparent electrode 6, reflective electrode 9) formed on the upper substrate 2 and lower substrate 3 allows controlling the emission (or not) of light.

A field light emission type liquid crystal material incorporating the joint characteristics of a liquid crystal layer and a field light effect layer, can as a liquid crystal layer for example,perform switching at approximately 5 volts, and as a light emission layer can perform switching at several dozen volts. Use of this material is related in more detail in Japanese Patent Laid-Open No. Hei 11-114526.

In the drive circuit for the field light emission liquid crystal material layer 20 in this case, as shown in FIG. 2A, a drive circuit for driving the field light emission liquid crystal material layer 20 as a liquid crystal layer, and a drive circuit for driving the field light emission type liquid crystal material layer 20 as a field light emission layer are an active matrix comprised from the same TFT (thin-film-transistor); the light emission type liquid crystal material layer 20 is driven by the same circuit as in the figure for field light emission, and when driving it as a liquid crystal layer without field light emission, the source and supply lines are preferably interchanged. The electrodes formed on the upper substrate 2 and the lower substrate 3 can therefore perform switching of the liquid crystal simultaneously with switching for light emission so that in dark surroundings an image can be displayed by making the layer emit light, and in bright surroundings the same reflective display can be obtained as for the reflective liquid crystal display device of the related art, without emitting light. The liquid crystal display device 1A therefore does not require a front light or back light, and is capable of displaying a high quality image.

In the liquid crystal display device 1A, when the field light emission type liquid crystal material layer 20 emits light, the emitted light is collected in the one side of reflective layer 11 so the brightness is improved.

When using the liquid crystal display device 1A in dark surroundings, the field light emission type liquid crystal material layer 20 does not continually emit light all the time, and light is emitted just from the required pixels by switching to the liquid crystal layer of the field light emission liquid crystal material layer 20 so that power consumption can be lowered, there is also no problem with the operation life span as exists in liquid crystal devices of the related art utilizing organic electroluminescent elements.

Figure 3A:
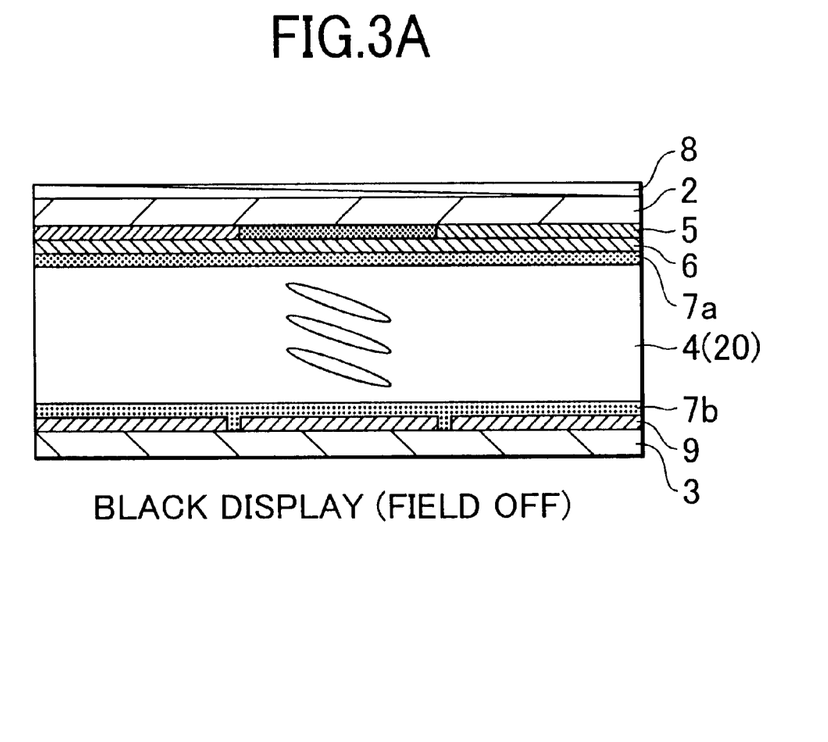
FIG. 3A and FIG. 3B are drawings showing a black display and a white display in bright surroundings by the liquid crystal display device of the present invention.
Figure 3B:
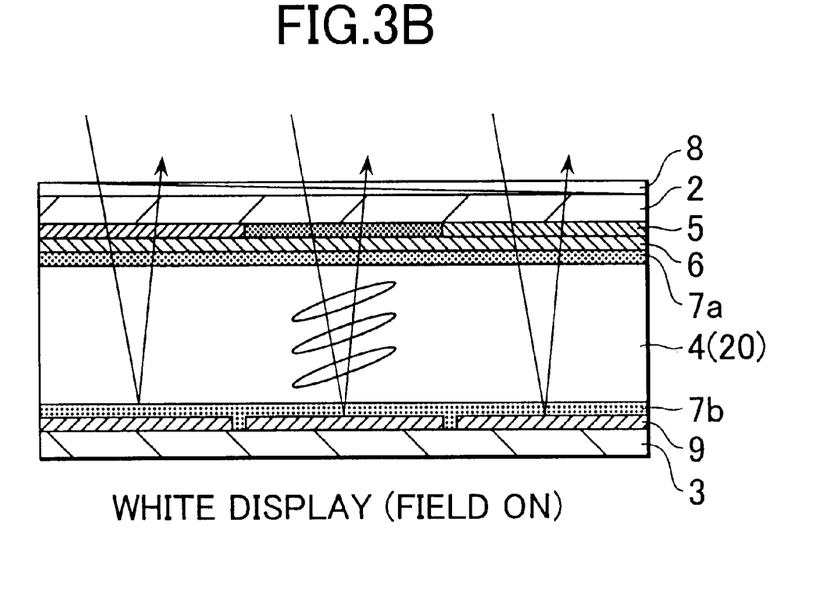
Figure 4A:
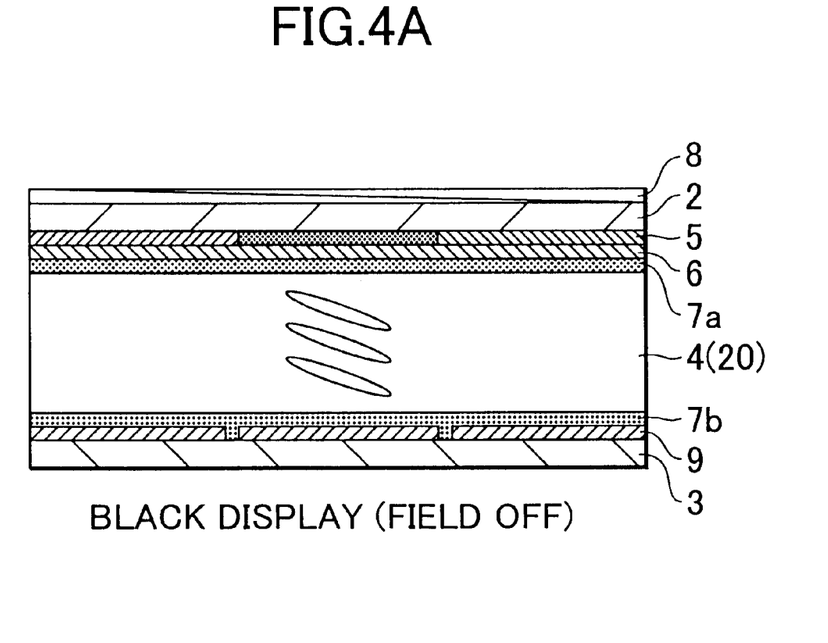
FIG. 4A and FIG. 4B are drawings showing a black display and a white display in dark surroundings for the liquid crystal display device of the present invention.
Figure 4B:
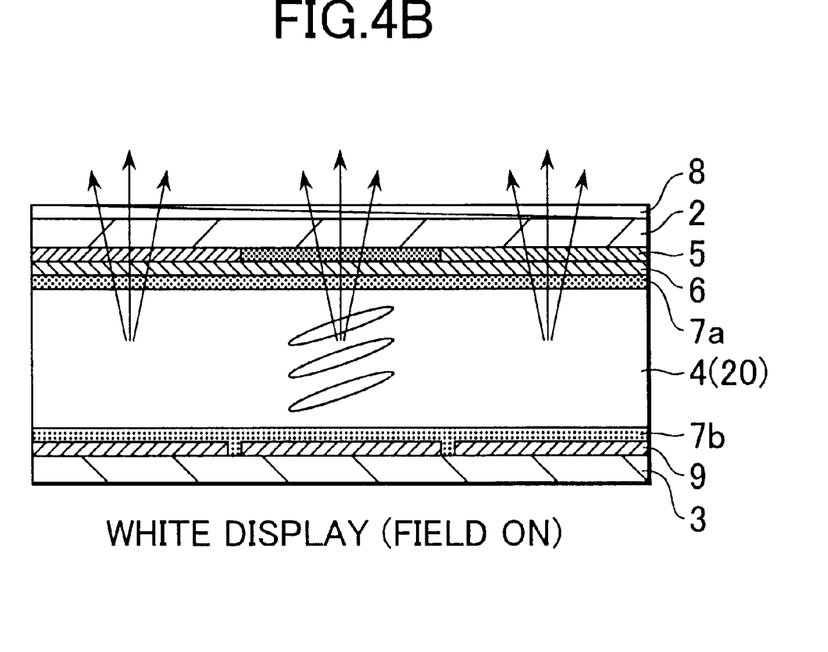
Figure 5:
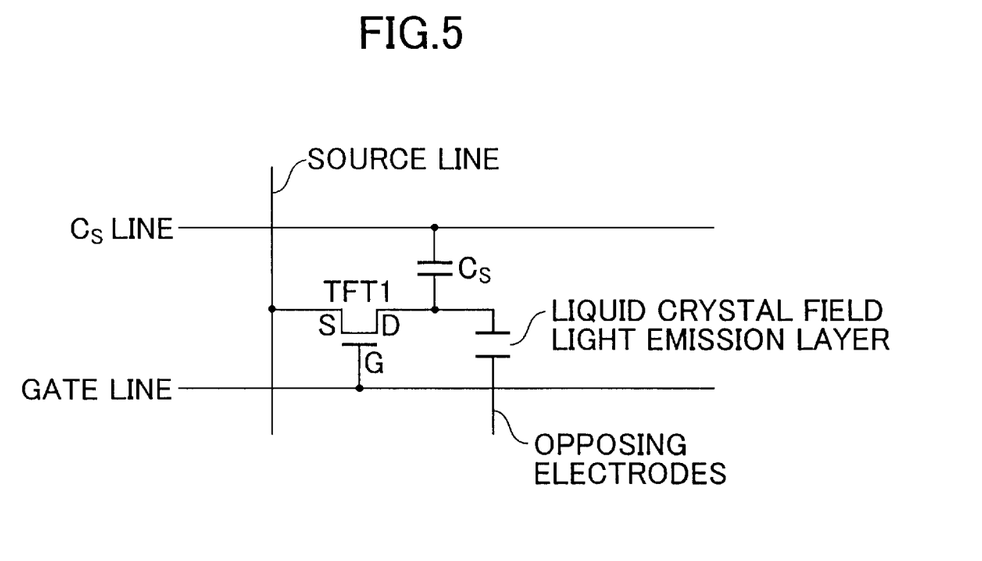
FIG. 5 is a drive circuit diagram for a one-pixel portion of the active matrix of a typical liquid crystal display device.

When contriving the liquid crystal display device 1A formed by a field light emission liquid crystal material layer 20 in this way, the liquid crystal layer is made to have a black display when no electrical field is applied, by adjusting the alignment direction of the liquid crystal layer constituted by the liquid crystal material layer 20, or in other words, setting to Normally Black mode. Therefore during a reflective display in bright surroundings, as shown in FIG. 3, a black display is made to appear by turning the electrical field to the emission type liquid crystal material layer 20 off, and a white display is made to appear by turning the electrical field to the emission type liquid crystal material layer 20 on. Conversely, setting the liquid crystal display device for a white display as the normally white mode, when no electrical field is applied to the liquid crystal layer, is not preferable since it will not show a black display when an electrical field (voltage) is applied to the emission type liquid crystal material layer 20.

In the liquid crystal display device 1A manufacturing method, there is no need to make the structure of the liquid crystal cell itself any different from the reflective liquid crystal device of the related art. Therefore just filling the liquid crystal cell with field light emission liquid crystal material instead of the liquid crystal material of the related art, is sufficient. In other words, it can be manufactured by forming a color filter 5, transparent electrode 6 and alignment layer A in sequence on the upper substrate 2, and a drive circuit, reflective electrode 9 and alignment layer 7b in sequence on the lower substrate 3, with the substrates facing each other, affixing them together at a specified cell gap, and injecting field light emission liquid crystal material between both substrates. This manufacturing method does not require the forming of an organic electroluminescent layer by vapor deposition as in the liquid crystal display device of the related art using organic electroluminescent elements as a light source. The liquid crystal display device 1A is therefore extremely simple to manufacture.

The liquid crystal element of the present invention can rendered in a variety of configurations other than described above. For example when forming a light emission type liquid crystal material layer 20 as the liquid crystal layer 4, the same as the liquid crystal element 1A of FIG. 1, a drive circuit absolutely identical to the active matrix of a general liquid crystal display device of the related art may be used as the drive circuit for the light emission type liquid crystal material layer 20 without forming the dual drive circuits as in FIG. 2A. However in this case, the Cs capacity is preferably greatly increased compared to the drive circuit for the liquid crystal display device of the related art in order to maintain a switching voltage for the field light layer. Therefore, a capacitor with a sufficiently large capacity is preferably formed beneath the reflective layer 11.

Figure 6:
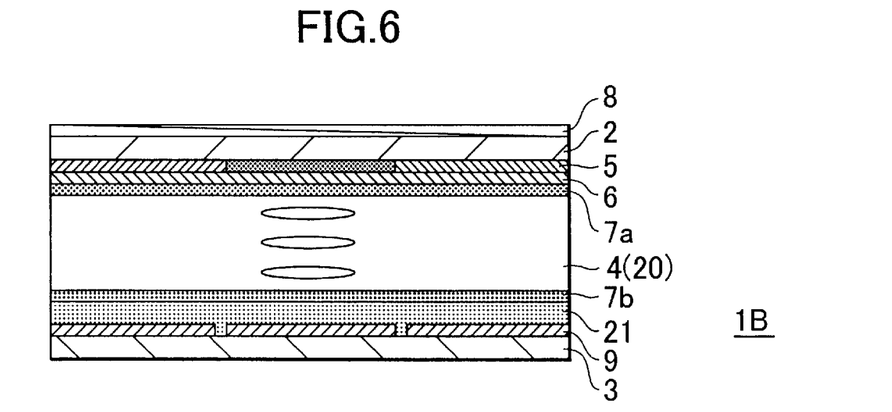
FIG. 6 is a conceptual cross-sectional view of the liquid crystal display device of the present invention.

FIG. 6 is a conceptual cross-sectional view of the liquid crystal display device of the present invention. A liquid crystal display device 1B is formed with a field light emission layer 21 between the upper substrate 2 and the lower substrate 3 and separate from the liquid crystal layer 4. In this case, the upper substrate 2 is made from transparent substrate the same as the liquid crystal display device 1A of FIG. 1, and a color filter 5, transparent electrode 6, and alignment film 7a are formed on the surface facing the lower substrate 3, with a deflecting plate 8 laminated on the opposite side (of upper substrate 2).

A reflecting electrode 9, the same as in the liquid crystal display device 1A of FIG. 1, is formed on the upper substrate 3 on the side facing the upper substrate 2, and a field light emission layer 21 is formed on the reflective electrode 9, and an alignment film 7b is formed on the field light emission layer 21.

The liquid crystal layer 4 and field light emission layer 21 in the liquid crystal display device 1B are both driven by a field (voltage) applied by the reflective electrode 9 and the transparent electrode 6. In bright surroundings, this liquid crystal display device 1B shows a reflective display in external light, the same as a reflective liquid crystal display device; and in dark surroundings, a display can be made by the liquid crystal layer 4 switching the field light emission layer 21 so only the required pixels emit light.

Liquid crystal properties are not required in the field light emission layer 21 used in this liquid crystal display device 1B so that the structural material is not limited to the aforementioned field light emission type liquid crystal material and an organic electroluminescent material of the known art such as is disclosed in Japanese Patent Laid-Open No. 2000-173773 maybe utilized. Further, a laminated structure of a positive hole carrier layer or electron carrier layer, or a laminated structure of a positive hole carrier layer and light emitting material layer and electron carrier layer may be used as layer material for the field light emission layer 21.

In the method for manufacturing the liquid crystal display device 1B, a color filter 5, a transparent electrode 6 and an alignment film 7a may be formed in sequence on the upper substrate 2, and a drive circuit, reflective electrode 9, field light emission layer 21 and alignment film 7b formed in sequence on the lower substrate 3, with these substrates facing each other, affixed together at a specified cell gap, and liquid crystal material injected between the substrates. In this case, the field light emission layer 21 can be formed by vapor deposition, the same as the organic electroluminescent material of the known art.

Preferably, material of different light (emission) wavelengths is used for matching the RGB pixels of the color filter 5 when installing the emission type liquid crystal material layer 20 in the configuration in FIG. 1, or the field light emission layer 21 having no liquid crystal properties as shown in FIG. 6 as the field light emission layer of the present invention. Doing this (using different wavelength material to match the RGB pixels) allows easily showing a full color display when emitting light from the field light emission layer. Further, forming the field light emission layer from white light emission material, is preferable since a full color display can be obtained, without having to utilize material of different light wavelengths for each pixel. Further, forming the field light emission layer from material emitting ultraviolet light is preferable since a color display utilizing luminophors (fluophors) has good color purity and an extremely high quality display.

Figure 7:
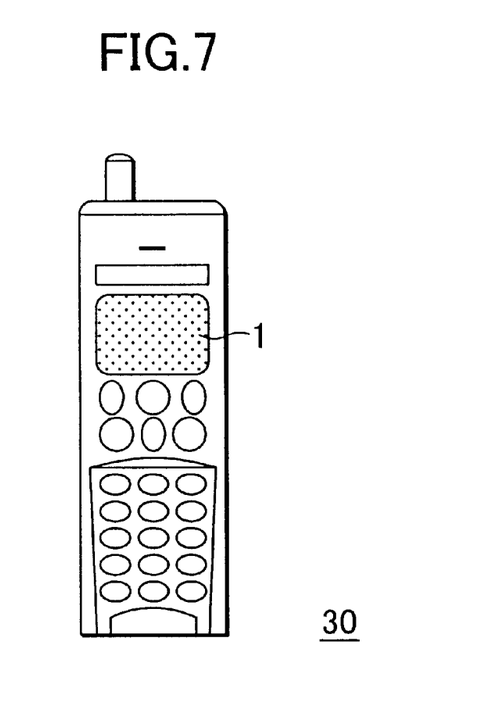
FIG. 7 is an external view of a cellular telephone.
Figure 8:
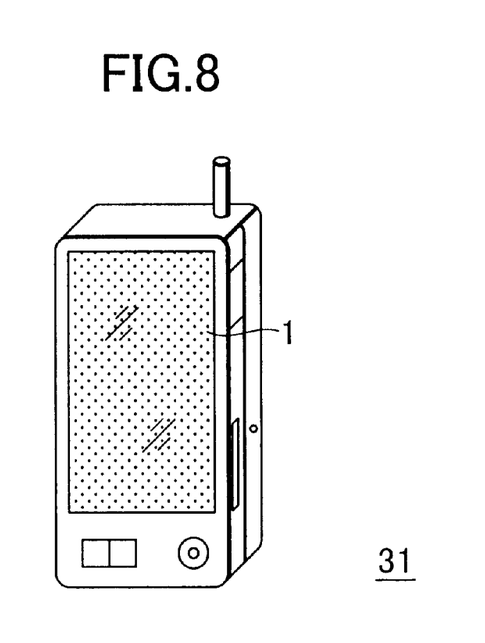
FIG. 8 is an external view of a portable terminal device.

The liquid crystal display device of the present invention is lightweight with a thin shape, and low power consumption as shown in the cellular telephone 30 of FIG. 7 and in the portable terminal device 31 of FIG. 8, and in both dark and bright surroundings is also effective in rendering a satisfactory image of high visibility on the liquid crystal display device 1 used as the portable information terminal. The present invention is also inclusive of portable information terminals containing the liquid crystal display device of the present invention.

What is claimed is:

1. A liquid crystal display device, comprising;

a pair of substrates;

a pair of electrodes disposed between the substrates;

a liquid crystal layer enclosed by said pair of substrates and operably connected to said electrodes; and a field light emission layer driven by said electrodes and formed between the pair of said substrates, wherein the liquid crystal display device has a dark display when no electrical potential is applied to said liquid crystal layer.

2. A liquid crystal display device according to claim 1, wherein a reflective layer is formed on one substrate and another field light emission layer is formed between said reflective layer and other said substrate.

3. A liquid crystal display device comprising:

a pair of substrates with electrodes disposed on opposite sides of the substrates and facing each other; and a liquid crystal layer enclosed by said pair of substrates such that the liquid crystal display device shows a dark display when no electrical potential is applied to said liquid crystal layer, wherein a field light emission layer driven by said electrodes is formed between the pair of said substrates and wherein the liquid crystal layer and the field light emission layer are combined to form a field light emission liquid crystal material layer.

4. A liquid crystal display device according to claim 3, wherein a circuit for driving the field light emission liquid crystal material layer as the liquid crystal layer, and a circuit for driving the field light emission liquid crystal material layer as a field light emission layer are a joint circuit.

5. A liquid crystal display device according to claim 4, wherein said field light emission layer is composed of organic electroluminescent material.

6. A liquid crystal display device according to claim 1, further comprising a plurality of RGB pixels, wherein the field light emission layer is one of a plurality of field light emission layers formed of different wavelengths each RGB pixel.

7. A liquid crystal display device according to claim 1, the field light emission layer is formed to emit white light.

8. A liquid crystal display device according to claim 1, the field light emission layer is formed to emit ultraviolet rays.

* * * * *